(12) United States Patent
Intagliata et al.

(10) Patent No.: US 11,001,321 B2
(45) Date of Patent: *May 11, 2021

(54) APPARATUS FOR SUPPORTING A COMPONENT MOUNTING PLATE BETWEEN TRAILER BEAMS

(71) Applicant: Bendix Commercial Vehicle Systems LLC, Elyria, OH (US)

(72) Inventors: Jon D. Intagliata, Avon, OH (US); Joseph M. Macnamara, Ashland, OH (US); Anthony J. Cydzik, LaGrange, OH (US); Gary J. Brewer, Elyria, OH (US); Curt M. Geideman, Grafton, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/004,477

(22) Filed: Aug. 27, 2020

(65) Prior Publication Data

US 2020/0391815 A1 Dec. 17, 2020

Related U.S. Application Data (63) Continuation of application No. 16/023,718, filed on Jun. 29, 2018, now Pat. No. 10,787,213.

(51) Int. Cl.
*B62D 63/06* (2006.01)
*B62D 63/08* (2006.01)
(Continued)

(52) U.S. Cl.
CPC .............. *B62D 63/08* (2013.01); *B60T 7/20* (2013.01); *B62D 27/065* (2013.01);
(Continued)

(58) Field of Classification Search
CPC ...... B60T 7/20; B60T 2270/10; B60T 8/3685; B62D 63/06; B62D 63/08; B62D 27/065;
(Continued)

(56) References Cited

U.S. PATENT DOCUMENTS 3,706,169 A * 12/1972 Rensch ................. E04B 2/7453
52/263
6,802,169 B2 * 10/2004 Simmons ................. F16B 7/22
52/648.1

(Continued)

*Primary Examiner* — Tan Le
(74) *Attorney, Agent, or Firm* — Brian Kondas; Cheryl Greenly; Eugene Clair (57) ABSTRACT

An apparatus is provided for supporting a component mounting plate that is suspended between a first trailer beam and a second trailer beam. The apparatus comprises a pair of top supporting members including (i) a first top supporting member secured to the plate, and (ii) a second top supporting member secured to the plate. Each of the first and second top members spans between and engages the first and second trailer beams. The apparatus also comprises a pair of bottom supporting members including a first bottom supporting member and a second bottom supporting member. The apparatus further comprises a pair of fastening mechanisms including (i) a first fastening mechanism that secures at least the first top member to the plate, and (ii) a second fastening mechanism that secures at least the second top member to the plate.

13 Claims, 6 Drawing Sheets

(51) Int. Cl.
*F16B 1/00* (2006.01)
*F16B 5/02* (2006.01)
*F16M 13/02* (2006.01)
*B60T 8/176* (2006.01)
*F16B 2/02* (2006.01)
*B60T 7/20* (2006.01)
*B62D 27/06* (2006.01)
*B62D 23/00* (2006.01)
*B62D 21/00* (2006.01)
*B60T 8/36* (2006.01)
*F16B 5/00* (2006.01)

(52) U.S. Cl.
CPC ......... *B60T 8/3685* (2013.01); *B60T 2270/10* (2013.01); *B62D 21/00* (2013.01); *B62D 23/00* (2013.01); *F16B 2/02* (2013.01); *F16B 5/00* (2013.01)

(58) Field of Classification Search
CPC ... B62D 21/00; B62B 9/08; F16B 2/02; F16B 5/00
See application file for complete search history.

(56) References Cited

U.S. PATENT DOCUMENTS

| 7,874,120 B2* | 1/2011 | Ohata | E04B 1/2403 |
| | | | 52/655.1 |
| 8,511,929 B2* | 8/2013 | Raye | B60C 23/10 |
| | | | 403/385 |

* cited by examiner

APPARATUS FOR SUPPORTING A COMPONENT MOUNTING PLATE BETWEEN TRAILER BEAMS

BACKGROUND

The present application relates to vehicle trailers having beams, and is particularly directed to an apparatus for supporting a component mounting plate between trailer I-beams.

A typical component mounting plate for a vehicle trailer having beams (e.g., I-beams) is required to be generally vertical and transverse to the longitudinal axis of the vehicle trailer (i.e., generally parallel to the trailer beams). Vehicle components, such as an anti-lock braking system module for example, are attached to the component mounting plate. The component mounting plate is usually attached between a pair of trailer beams to attach the vehicle components to the vehicle trailer.

For example, U.S. Pat. No. 9,604,611 discloses a module panel 100 (see FIG. 1) that is attached to mounting surfaces 105, 110 of a pair of I-beams using mounting elements 115, 120. Each of the mounting elements 115, 120 has a shape that provides an opening for receiving an edge of one of the I-beams. The shape of each of the mounting elements 115, 120 is complex due to at least the number of bends that are needed to form the shape of the mounting element to provide the opening for receiving an edge of one of the I-beams. As such, fabrication costs are high.

As another example, U.S. Pat. No. 5,292,096 discloses a cross member 10 (see FIGS. 6 and 7) that is attached to a pair of I-beams 80, 90 using a pair of sliding guides 30, 130 and a pair of clamp plates 50, 50. The shape of one of the sliding guides 30, 130 is shown in FIGS. 2, 2a, and 2b, and the shape of one of the clamp plates 50, 50 is shown in FIGS. 3a and 3b. The shape of the sliding guide 30 shown in FIGS. 2, 2a, and 2b is complex due to at least a raised tooth 40 and a fixing pin 38, which are needed to make the sliding guide 30. Similarly, the shape of the clamp plate 50 shown in FIGS. 3a and 3b is complex due to at least an oblong cutout 52, a notched end 54, and a recess 60, which are needed to make the clamp plate 50. As such, fabrication costs are high.

Accordingly, those skilled in the art continue with research and development efforts in the field of vehicle trailers to overcome drawbacks in prior art solutions.

SUMMARY

In accordance with one example embodiment, an apparatus is provided for supporting a component mounting plate that is suspended between a first trailer beam and a second trailer beam. The apparatus comprises a pair of top supporting members including (i) a first top supporting member secured to the component mounting plate, and (ii) a second top supporting member secured to the component mounting plate. Each of the first and second top supporting members spans between and engages the first and second trailer beams. The apparatus also comprises a pair of bottom supporting members including a first bottom supporting member and a second bottom supporting member. The apparatus further comprises a pair of fastening mechanisms including (i) a first fastening mechanism that secures at least the first top supporting member to the component mounting plate, and (ii) a second fastening mechanism that secures at least the second top supporting member to the component mounting plate.

In accordance with another example embodiment, an apparatus comprises a component mounting plate that is suspended between a first trailer beam and a second trailer beam, and one or more vehicle modules secured to the component mounting plate. The apparatus also comprises a pair of top supporting members including (i) a first top supporting member secured to the component mounting plate, and (ii) a second top supporting member secured to the component mounting plate. Each of the first and second top supporting members spans between and engages a flange of the first trailer beam and a flange of the second trailer beam. The apparatus further comprises a pair of bottom supporting members including (i) a first bottom supporting member secured to the component mounting plate, and (ii) a second bottom supporting member secured to the component mounting plate. Each of the first and second bottom supporting members spans between and engages the flange of the first trailer beam and the flange of the second trailer beam. The apparatus also comprises a pair of fastening mechanisms including (i) a first fastening mechanism that secures the first top supporting member and the first bottom supporting member to the component mounting plate, and (ii) a second fastening mechanism that secures the second top supporting member and the second bottom supporting member to the component mounting plate.

In accordance with yet another example embodiment, an apparatus comprises a substantially U-shaped component mounting plate that is suspended between a first trailer beam and a second trailer beam, and one or more vehicle modules secured to a surface of the U-shaped component mounting plate. The apparatus also comprises a pair of top supporting members including (i) a first substantially L-shaped top supporting member secured to the U-shaped component mounting plate, and (ii) a second substantially L-shaped top supporting member secured to the U-shaped component mounting plate. Each of the first and second L-shaped top supporting members spans between and engages only one flange of the first trailer beam and only one flange of the second trailer beam. The apparatus further comprises a pair of bottom supporting members including (i) a first substantially L-shaped bottom supporting member secured to the first L-shaped top supporting member, and (ii) a second substantially L-shaped bottom supporting member secured to the second L-shaped top supporting member. Each of the first and second L-shaped bottom supporting members spans between and engages the only one flange of the first trailer beam and the only one flange of the second trailer beam. The apparatus also comprises a pair of fastening mechanisms including (i) a first fastening mechanism that secures the first L-shaped top supporting member to the U-shaped component mounting plate, and (ii) a second fastening mechanism that secures the second L-shaped top supporting member to the U-shaped component mounting plate.

In accordance with still another embodiment, an apparatus comprises a substantially U-shaped component mounting plate that is suspended between a first trailer beam and a second trailer beam. The apparatus also comprises a plurality of vehicle modules including (i) a first vehicle module secured to an outer surface of a bottom portion of the U-shaped component mounting plate, (ii) a second vehicle module secured to an outer surface of a first leg portion of the U-shaped component mounting plate, and (iii) a third vehicle module secured to an outer surface of a second leg portion of the U-shaped component mounting plate. The apparatus further comprises a pair of top supporting members secured to the U-shaped component mounting plate and spanning between only one flange of the first trailer beam and only one flange of the second trailer beam.

BRIEF DESCRIPTION OF THE DRAWINGS

FIG. 2C is a bottom view, looking approximately in the direction along line 2C-2C shown in FIG. 2B, with the removed trailer beam added back in.

DETAILED DESCRIPTION

Figure 1A:
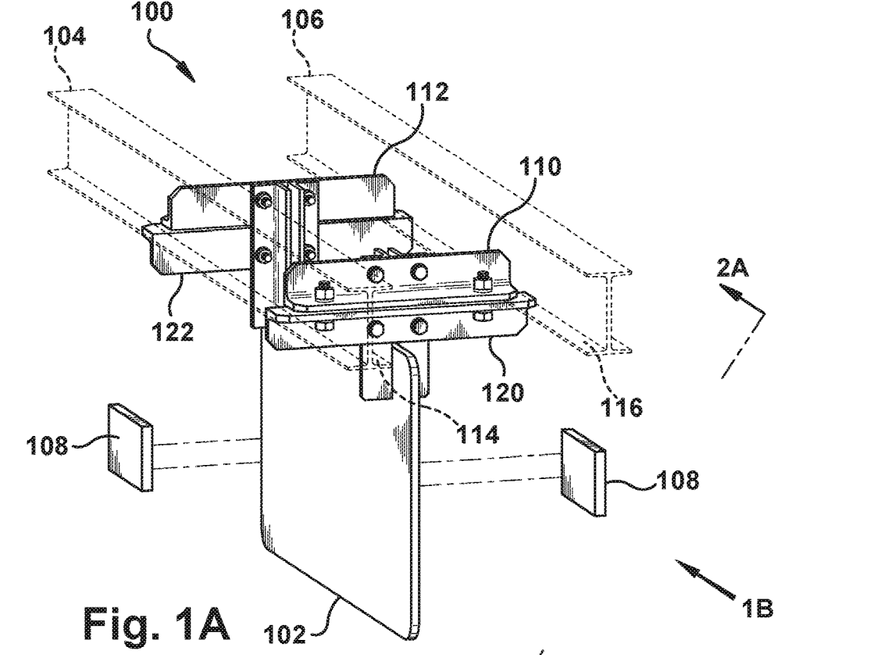
FIG. 1A is a perspective view of an apparatus constructed in accordance with an embodiment.
Figure 1B:
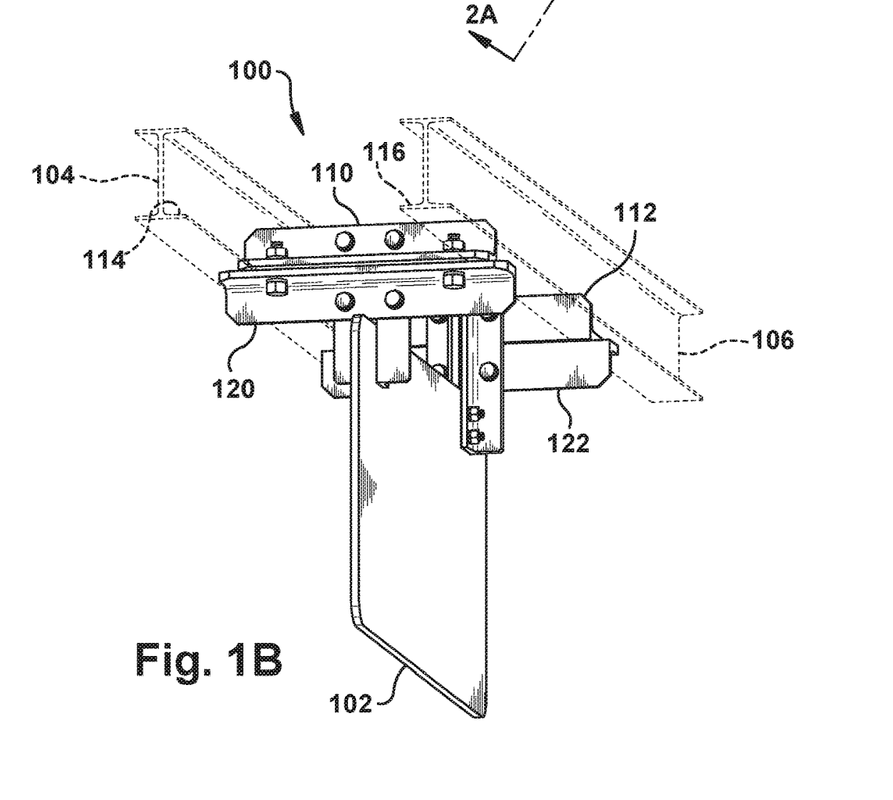
FIG. 1B is a perspective view looking approximately in the direction of arrow 1B shown in FIG. 1A.
Figure 2A:
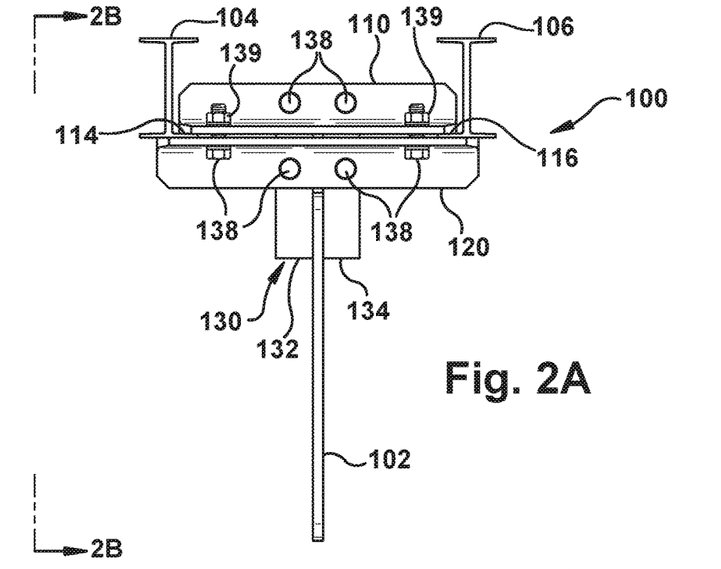
FIG. 2A is an elevational view looking approximately in the direction along line 2A-2A shown in FIG. 1A.
Figure 2B:
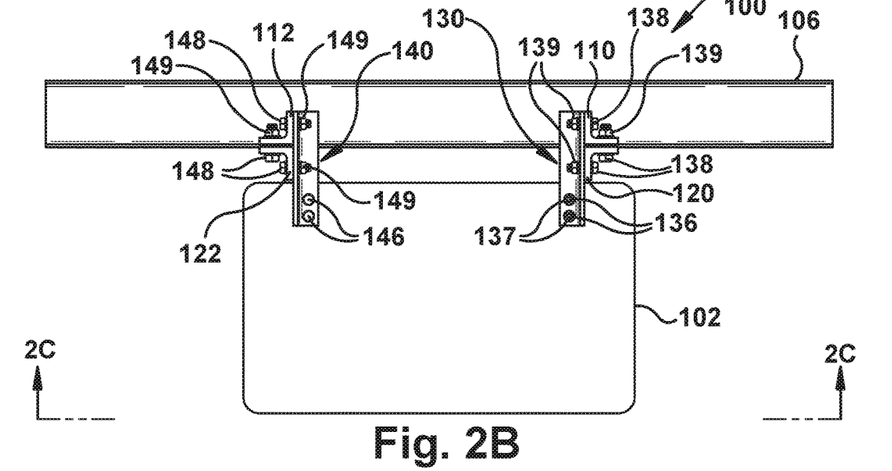
FIG. 2B is an elevational view, looking approximately in the direction along line 2B-2B shown in FIG. 2A, with a trailer beam removed.
Figure 2C:
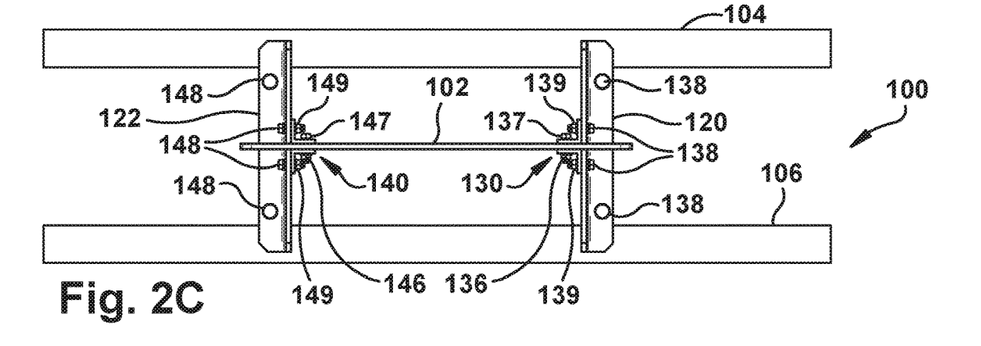

Referring to FIG. 1A, a perspective view of an apparatus 100 constructed in accordance with an embodiment is illustrated. FIG. 1B is a perspective view looking approximately in the direction of arrow 1B shown in FIG. 1A. FIG. 2A is an elevational view looking approximately in the direction along line 2A-2A shown in FIG. 1A. FIG. 2B is an elevational view, looking approximately in the direction along line 2B-2B shown in FIG. 2A, with a trailer beam removed to show other parts more clearly. FIG. 2C is a bottom view, looking approximately in the direction along line 2C-2C shown in FIG. 2B, with the removed trailer beam added back in.

The apparatus 100 comprises a substantially flat component mounting plate 102 that is suspended between a first trailer I-beam 104 and a second trailer I-beam 106, which are shown in phantom lines in FIG. 1A. One or more vehicle modules 108 (shown only in FIG. 1A) are secured to the component mounting plate 102. The one or more vehicle modules 108 may be secured to either major surface of the flat component mounting plate 102. As an example as shown in FIG. 1A, one vehicle module 108 is secured to one major surface of the flat component mounting plate 102, and another vehicle module 108 is secured to the other major surface of the flat component mounting plate 102.

The one or more vehicle modules 108 may be secured (e.g., attached or fastened) to the flat component mounting plate 102 either directly (i.e., touching) or indirectly (i.e., not touching). For example, the one or more vehicle modules 108 may be indirectly secured to the flat component mounting plate 102 via a bulk-head fitting (not shown). Alternatively, the one or more vehicle modules 108 may be directly secured to the flat component mounting plate 102 (i.e., without a bulk-head fitting).

The one or more vehicle modules 108 secured to the flat component mounting plate 102 may include at least one of a trailer roll-stability module and a trailer anti-lock braking system (ABS) module, for examples. Other types of vehicle modules are possible. It is conceivable that any combination of vehicle modules be mounted to the flat component mounting plate 102.

The apparatus 100 also comprises a pair of top supporting members including a first substantially L-shaped top supporting member 110 secured to the flat component mounting plate 102, and a second substantially L-shaped top supporting member 112 secured to the flat component mounting plate 102. Each of the first and second L-shaped top supporting members 110, 112 spans between and engages only one flange 114 of the first trailer I-beam 104 and only one flange 116 of the second trailer I-beam 106. The flat component mounting plate 102 may be secured (e.g., attached or fastened) to an L-shaped top supporting member either directly (i.e., touching) or indirectly (i.e., not touching).

The apparatus 100 further comprises a pair of bottom supporting members including a first substantially L-shaped bottom supporting member 120 secured to the flat component mounting plate 102, and a second substantially L-shaped bottom supporting member 122 secured to the flat component mounting plate 102. Each of the first and second L-shaped bottom supporting members 120, 122 spans between and engages the only one flange 114 of the first trailer I-beam 104 and the only one flange 116 of the second trailer I-beam 106. The flat component mounting plate 102 may be secured (e.g., attached or fastened) to an L-shaped bottom supporting member either directly (i.e., touching) or indirectly (i.e., not touching).

The length of each of the first and second L-shaped top supporting members 110, 112 must not only be long enough to span the distance between the flange 114 of the first trailer I-beam 104 and the flange 116 of the second trailer I-beam 106, but also must be sufficiently long enough to be engaged with top surfaces of the flanges 114, 116 so that the flat component mounting plate 102 and the one or more vehicle modules 108 secured thereto can be supported by the first and second L-shaped top supporting members 110, 112.

Moreover, the length of each of the first and second L-shaped bottom supporting members 120, 122 must not only be long enough to span the distance between the flange 114 of the first trailer I-beam 104 and the flange 116 of the second trailer I-beam 106, but also must be sufficiently long enough to be engaged with bottom surfaces of the flanges 114, 116 so that the flat component mounting plate 102 and the one or more vehicle modules 108 secured thereto are held in place and unable to jounce upwards during vehicle operation.

Each of the length of the first L-shaped bottom supporting member 120 and the length of the second L-shaped bottom supporting member 122 may be longer than each of the length of the first L-shaped top supporting member 110 and the length of the second L-shaped top supporting member 112. Preferably, the length of each of the first and second L-shaped top supporting members 110, 112 is substantially the same, and the length of each of the first and second bottom supporting members 120, 122 is substantially the same. It is also conceivable that the lengths of all four of the L-shaped supporting members 110, 112, 120, 122 are substantially the same.

One leg of the first L-shaped top supporting member 110 and one leg of the first L-shaped bottom supporting member 120 are secured together. Similarly, one leg of the second L-shaped top supporting member 112 and one leg of the second L-shaped bottom supporting member 122 are secured together.

The apparatus 100 also comprises a pair of fastening mechanisms including a first fastening mechanism 130 that secures the first L-shaped top supporting member 110 and the first L-shaped bottom supporting member 120 to the flat component mounting plate 102, and a second fastening mechanism 140 that secures the second L-shaped top supporting member 112 and the second L-shaped bottom supporting member 122 to the flat component mounting plate 102.

Figure 3A:
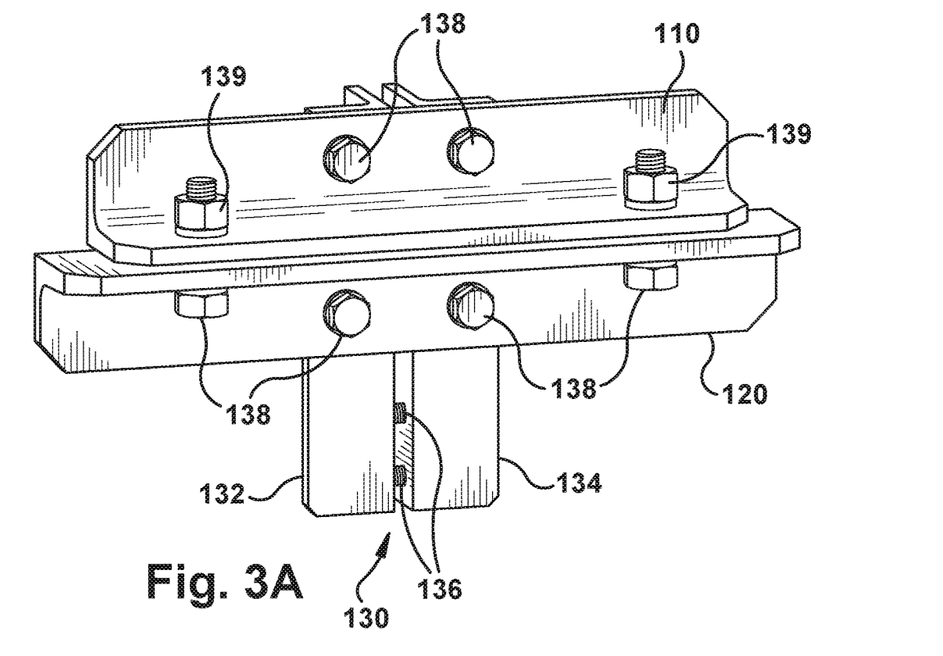
FIG. 3A is an enlarged perspective view of a portion of the apparatus shown in FIG. 1A.
Figure 3B:
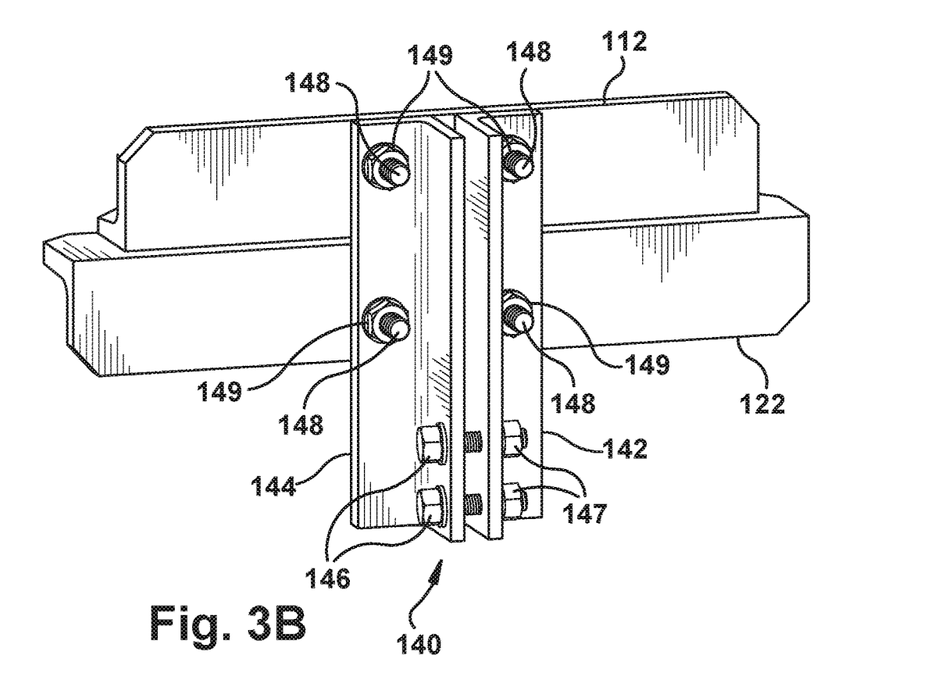
FIG. 3B is an enlarged perspective view of another portion of the apparatus shown in FIG. 1A.

Referring to FIG. 3A, an enlarged perspective view of a portion of the apparatus 100 shown in FIG. 1A is illustrated. FIG. 3B is an enlarged perspective view of another portion of the apparatus 100 shown in FIG. 1A.

As best shown in FIG. 3A, the first fastening mechanism 130 includes a first pair of substantially L-shaped brackets 132, 134 in which one leg of each of the L-shaped brackets 132, 134 is secured to a major surface of the flat component mounting plate 102 (not shown in FIG. 3A) and the other leg of each of the L-shaped brackets 132, 134 is secured to the first L-shaped top supporting member 110 and the first L-shaped bottom supporting member 120.

More specifically, the first fastening mechanism 130 further includes a number of threaded bolts 136 and a corresponding number of threaded nuts 137 (hidden in FIG. 3A and best shown in FIGS. 2B and 2C) that secure the first L-shaped top supporting member 110 and the flat component mounting plate 102 together. The first fastening mechanism 130 also includes a number of threaded bolts 138 and a corresponding number of threaded nuts 139 that secure the first L-shaped top supporting member 110, the first L-shaped bottom supporting member 120, and the first pair of L-shaped brackets 132, 134 together as a unit.

Similarly, as shown in FIG. 3B, the second fastening mechanism 140 includes a second pair of substantially L-shaped brackets 142, 144 in which one leg of each of the L-shaped brackets 142, 144 is secured to a major surface of the flat component mounting plate 102 (not shown in FIG. 3B) and the other leg of each of the L-shaped brackets 142, 144 is secured to the second L-shaped top supporting member 112 and the second L-shaped bottom supporting member 122.

More specifically, the second fastening mechanism 140 further includes a number of threaded bolts 146 and a corresponding number of threaded nuts 147 that secure the second L-shaped top supporting member 112 and the flat component mounting plate 102 together. The second fastening mechanism 140 also includes a number of threaded bolts 148 and a corresponding number of threaded nuts 149 that secure the second L-shaped top supporting member 112, the second L-shaped bottom supporting member 122, and the second pair of L-shaped brackets 142, 144 together as a unit.

Referring again to FIG. 3A, the two threaded bolts 138 passing through the vertical leg portion of the first L-shaped top supporting member 110 and the two threaded bolts 138 passing through the vertical leg portion of the first L-shaped bottom supporting member 120 center the flat component mounting plate 102. However, it is conceivable that the two threaded bolts 138 passing through the vertical leg portion of the first L-shaped top supporting member 110 and the two threaded bolts 138 passing through the vertical leg portion of the first L-shaped bottom supporting member 120 can be offset, such as illustrated in FIG. 3C.

Figure 3C:
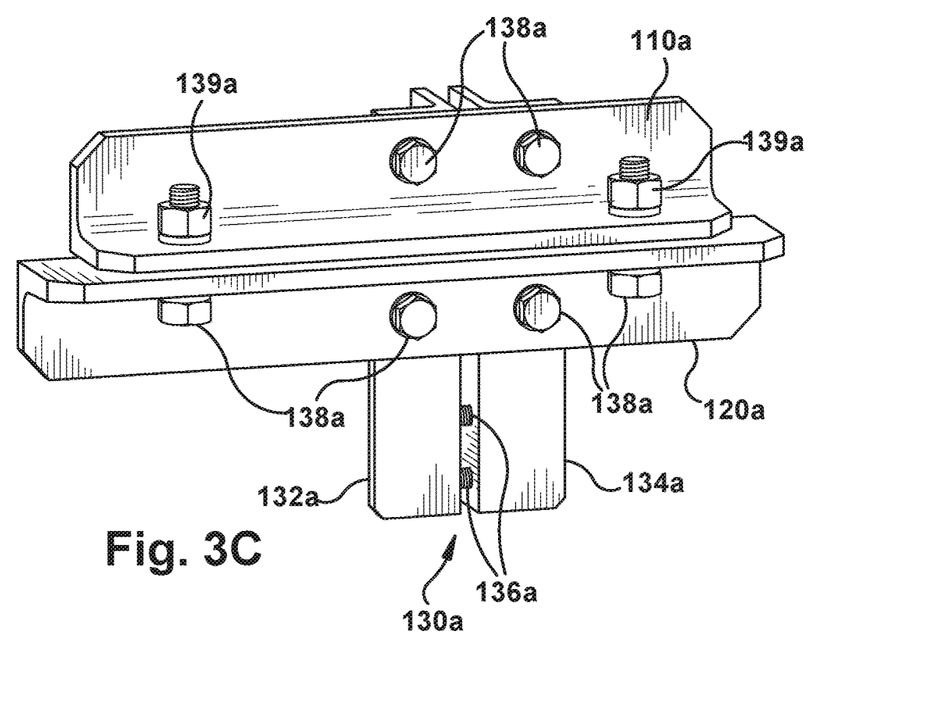
FIG. 3C is a view similar to FIG. 3A, and shows the enlarged portion constructed in accordance with another embodiment.

FIG. 3C is a view similar to FIG. 3A in which like components are illustrated with like reference numerals with a suffix "a" added to avoid confusion. As shown in FIG. 3C, the two threaded bolts 138a passing through the vertical portion of the first L-shaped top supporting member 110a and the two threaded bolts 138a passing through the vertical leg portion of the first L-shaped bottom supporting member 120a are offset to the right (as viewed looking at FIG. 3C). It is conceivable that the four threaded bolts 138a could be offset to the left instead of to the right. This offset (whether to the right or to the left) changes the moment of the flat component mounting plate (not shown in FIG. 3C), which changes the weight distribution of the flat component mounting plate between the first trailer I-beam (not shown) and the second trailer I-beam (also not shown). Accordingly, the offset of the two threaded bolts 138a passing through the vertical leg portion of the first L-shaped top supporting member 110a and the two threaded bolts 138a passing through the vertical leg portion of the first L-shaped bottom supporting member 120a can be varied so that the weight of the flat component mounting plate and the one or more vehicle modules mounted thereon is more evenly distributed between the first and second trailer I-beams.

Referring again to FIG. 3B, the two threaded bolts 148 passing through the vertical leg portion of the second L-shaped top supporting member 112 and the two threaded bolts 148 passing through the vertical leg portion of the second L-shaped bottom supporting member 122 center the flat component mounting plate 102. However, it is conceivable that the two threaded bolts 148 passing through the vertical leg portion of the second L-shaped top supporting member 112 and the two threaded bolts 148 passing through the vertical leg portion of the second L-shaped bottom supporting member 122 can be offset, such as illustrated in FIG. 3D.

Figure 3D:
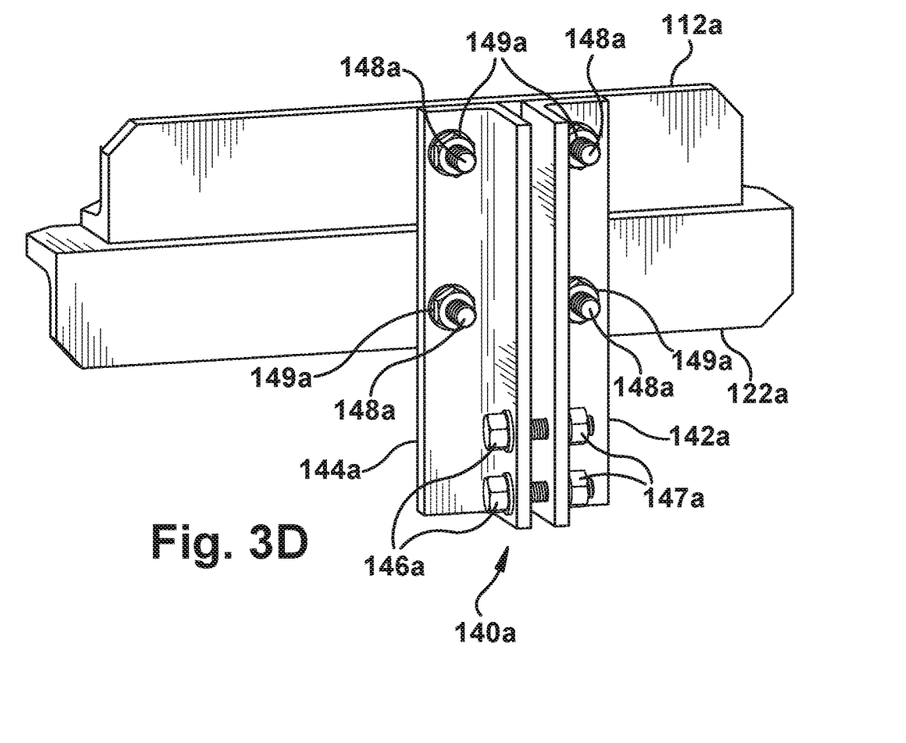
FIG. 3D is a view similar to FIG. 3B, and shows the enlarged portion constructed in accordance with another embodiment.

FIG. 3D is a view similar to FIG. 3B in which like components are illustrated with like reference numerals with a suffix "a" added to avoid confusion. As shown in FIG. 3D, the two threaded bolts 148a passing through the vertical portion of the second L-shaped top supporting member 112a and the two threaded bolts 148a passing through the vertical leg portion of the second L-shaped bottom supporting member 122a are offset to the right (as viewed looking at FIG. 3D). It is conceivable that the four threaded bolts 148a could be offset to the left instead of to the right. This offset (whether to the right or to the left) changes the moment of the flat component mounting plate (not shown in FIG. 3D), which changes the weight distribution of the flat component mounting plate between the first trailer I-beam (not shown) and the second trailer I-beam (also not shown). Accordingly, the offset of the two threaded bolts 148a passing through the vertical leg portion of the second L-shaped top supporting member 112a and the two threaded bolts 148a passing through the vertical leg portion of the second L-shaped bottom supporting member 122a can be varied so that the weight of the flat component mounting plate and the one or more vehicle modules mounted thereon is more evenly distributed between the first and second trailer I-beams.

Figure 4A:
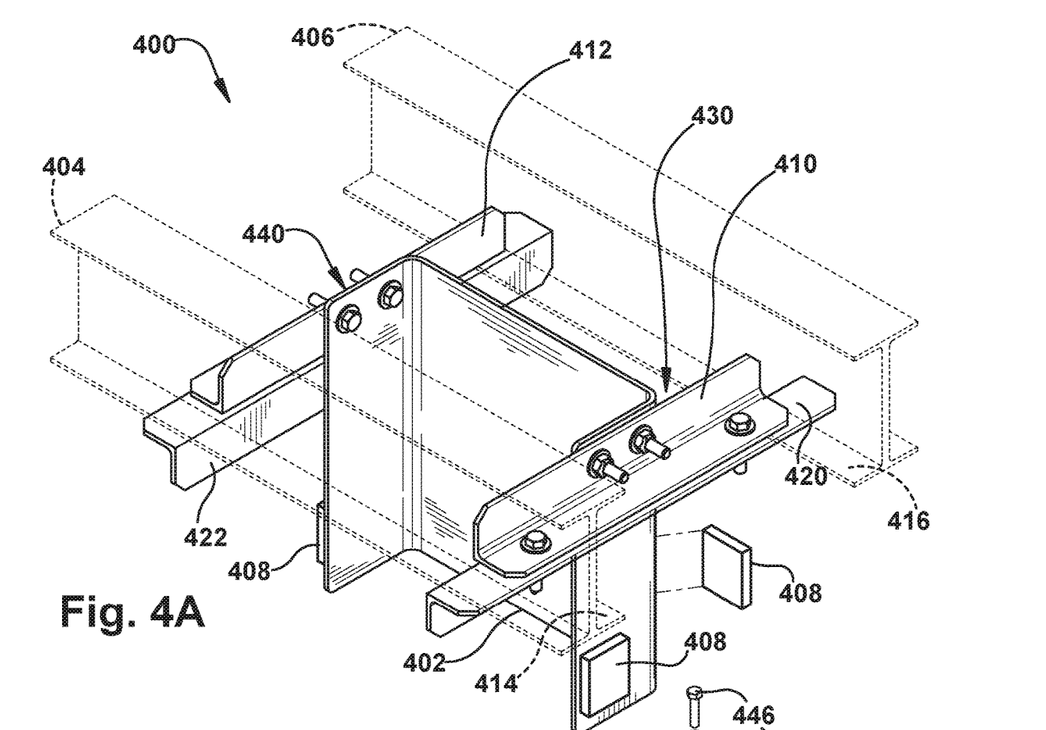
FIG. 4A is perspective view similar to FIG. 1A, and showing an apparatus constructed in accordance with another embodiment.
Figure 4B:
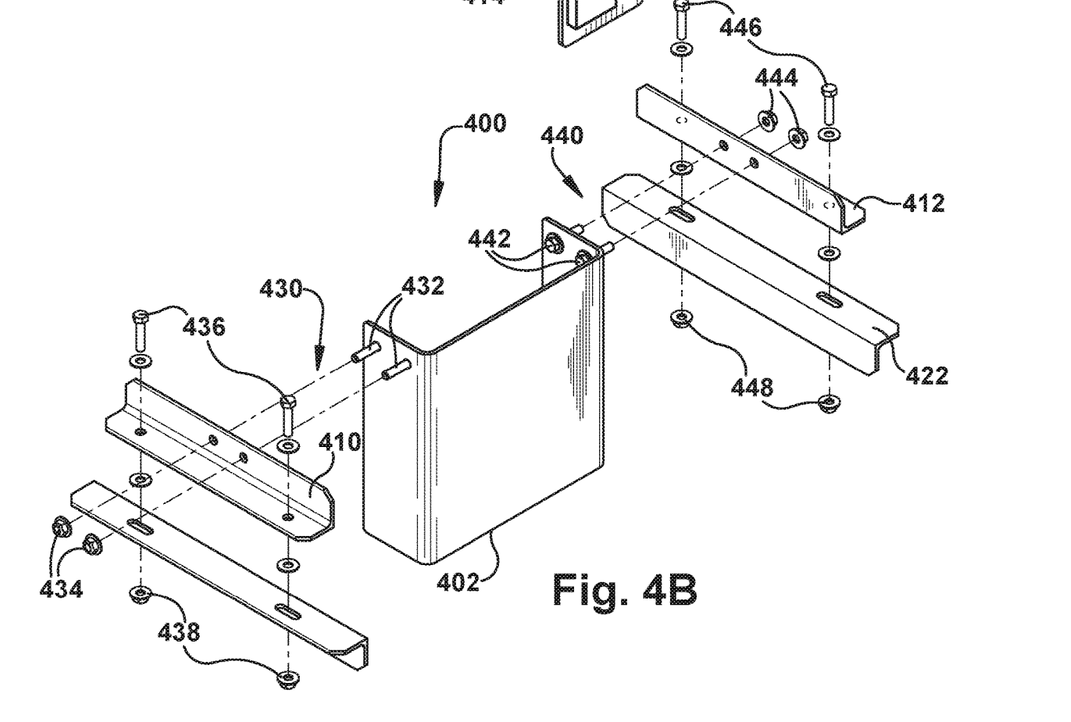
FIG. 4B is an exploded view of the apparatus of FIG. 4A.

Referring to FIG. 4A, a perspective view similar to FIG. 1A is illustrated. FIG. 4A shows an apparatus 400 constructed in accordance with another embodiment, which is a preferred embodiment. Since the embodiment shown in FIG. 4A is similar to the embodiment of FIG. 1A, like reference numbers of FIG. 1A are shown with numerals 300 higher in FIG. 4A. FIG. 4B is an exploded view of the apparatus of FIG. 4A.

The apparatus 400 comprises a substantially U-shaped component mounting plate 402 that is suspended between a first trailer I-beam 404 and a second trailer I-beam 406, which are shown in phantom lines in FIG. 4A. One or more vehicle modules 408 (shown only in FIG. 4A) are secured to a surface of the U-shaped component mounting plate 402. The one or more vehicle modules 408 may be secured to any surface of the U-shaped component mounting plate 402. As an example as shown in FIG. 4A, one vehicle module 408 is secured to an outer surface of the bottom portion of the U-shaped component mounting plate 402, another vehicle module 408 is secured to an outer surface of one leg portion of the U-shaped component mounting plate 402, and yet another vehicle module 408 is secured to an outer surface of the other leg portion of the U-shaped component mounting plate 402.

The one or more vehicle modules 408 may be secured (e.g., attached or fastened) to the U-shaped component mounting plate 402 either directly (i.e., touching) or indirectly (i.e., not touching). For example, the one or more vehicle modules 408 may be indirectly secured to the U-shaped component mounting plate 402 via a bulk-head fitting (not shown). Alternatively, the one or more vehicle modules 408 may be directly secured to the U-shaped component mounting plate 402 (i.e., without a bulk-head fitting).

The one or more vehicle modules 408 secured to the U-shaped component mounting plate 402 may include at least one of a trailer roll-stability module and a trailer anti-lock braking system (ABS) module, for examples. Other types of vehicle modules are possible. It is conceivable that any combination of vehicle modules be mounted to the U-shaped component mounting plate 402.

The apparatus 400 also comprises a pair of top supporting members including a first substantially L-shaped top supporting member 410 secured to the U-shaped component mounting plate 402, and a second substantially L-shaped top supporting member 412 secured to the U-shaped component mounting plate 402. Each of the first and second L-shaped top supporting members 410, 412 spans between and engages only one flange 414 of the first trailer I-beam 404 and only one flange 416 of the second trailer I-beam 406. The U-shaped component mounting plate 402 may be secured (e.g., attached or fastened) to an L-shaped top supporting member either directly (i.e., touching) or indirectly (i.e., not touching).

The apparatus 400 further comprises a pair of bottom supporting members including a first substantially L-shaped bottom supporting member 420 secured to the first L-shaped top supporting member 410, and a second substantially L-shaped bottom supporting member 422 secured to the second L-shaped top supporting member 412. Each of the first and second L-shaped bottom supporting members 420, 422 spans between and engages the only one flange 414 of the first trailer I-beam 404 and the only one flange 416 of the second trailer I-beam 406. The U-shaped component mounting plate 402 may be secured (e.g., attached or fastened) to an L-shaped bottom supporting member either directly (i.e., touching) or indirectly (i.e., not touching).

The length of each of the first and second L-shaped top supporting members 410, 412 must not only be long enough to span the distance between the flange 414 of the first trailer I-beam 404 and the flange 416 of the second trailer I-beam 406, but also must be sufficiently long enough to be engaged with top surfaces of the flanges 414, 416 so that the U-shaped component mounting plate 402 and the one or more vehicle modules 408 secured thereto can be supported by the first and second L-shaped top supporting members 410, 412.

Moreover, the length of each of the first and second L-shaped bottom supporting members 420, 422 must not only be long enough to span the distance between the flange 414 of the first trailer I-beam 404 and the flange 416 of the second trailer I-beam 406, but also must be sufficiently long enough to be engaged with bottom surfaces of the flanges 414, 416 so that the U-shaped component mounting plate 402 and the one or more vehicle modules 408 secured thereto are held in place and unable to jounce upwards during vehicle operation.

Each of the length of the first L-shaped bottom supporting member 420 and the length of the second L-shaped bottom supporting member 422 may be longer than each of the length of the first L-shaped top supporting member 410 and the length of the second L-shaped top supporting member 412. Preferably, the length of each of the first and second L-shaped top supporting members 410, 412 is substantially the same, and the length of each of the first and second L-shaped bottom supporting members 420, 422 is substantially the same. It is also conceivable that the lengths of all four of the L-shaped supporting members 410, 412, 420, 422 are substantially the same.

One leg of the first L-shaped top supporting member 410 and one leg of the first L-shaped bottom supporting member 420 are secured together. Similarly, one leg of the second L-shaped top supporting member 412 and one leg of the second L-shaped bottom supporting member 422 are secured together.

The apparatus 400 also comprises a pair of fastening mechanisms including a first fastening mechanism 430 that secures the first L-shaped top supporting member 410 to the U-shaped component mounting plate 402, and a second fastening mechanism 440 that secures the second L-shaped top supporting member 412 to the U-shaped component mounting plate 402.

More specifically, as shown in FIG. 4B, the first fastening mechanism 430 includes a number of threaded bolts 432 and a corresponding number of threaded nuts 434 that secure the first L-shaped top supporting member 410 and the U-shaped component mounting plate 402 together. The first fastening mechanism 430 also includes a number of threaded bolts 436 and a corresponding number of threaded nuts 438 that secure the first L-shaped top supporting member 410 and the first L-shaped bottom supporting member 420 together.

The two threaded bolts 432 passing through the vertical leg portion of the first L-shaped top supporting member 410 can be centered on the vertical leg portion of the first L-shaped top supporting member 410, as shown in FIGS. 4A and 4B. Alternatively, the two threaded bolts 432 can be offset (i.e., either to the right or the left in a horizontal plane) on the vertical leg portion of the first L-shaped top supporting member 410. This offset changes the moment of the U-shaped component mounting plate 402, which changes the weight distribution of the U-shaped component mounting plate 402 between the first trailer I-beam 404 and the second trailer I-beam 406. Accordingly, the offset of the two threaded bolts 432 passing through the vertical leg portion of the first L-shaped top supporting member 410 can be varied so that the weight of the U-shaped component mounting plate 402 and the one or more vehicle modules 408 mounted thereon is more evenly distributed between the first and second trailer I-beams 404, 406.

Similarly, the second fastening mechanism 440 includes a number of threaded bolts 442 and a corresponding number of threaded nuts 444 that fasten the second L-shaped top supporting member 412 and the U-shaped component mounting plate 402 together. The second fastening mechanism 440 also includes a number of threaded bolts 446 and a corresponding number of threaded nuts 448 that fasten the second L-shaped top supporting member 412 and the second L-shaped bottom supporting member 422 together.

The two threaded bolts 442 passing through the vertical leg portion of the second L-shaped top supporting member 412 can be centered on the vertical leg portion of the second L-shaped top supporting member 412, as shown in FIGS. 4A and 4B. Alternatively, the two threaded bolts 442 can be offset (i.e., either to the right or the left in a horizontal plane) on the vertical leg portion of the second L-shaped top supporting member 412. This offset changes the moment of the U-shaped component mounting plate 402, which changes the weight distribution of the U-shaped component mounting plate 402 between the first trailer I-beam 404 and the second trailer I-beam 406. Accordingly, the offset of the two threaded bolts 442 passing through the vertical leg portion of the second L-shaped top supporting member 412 can be varied so that the weight of the U-shaped component mounting plate 402 and the one or more vehicle modules 408 mounted thereon is more evenly distributed between the first and second trailer I-beams 404, 406.

Figure 5:
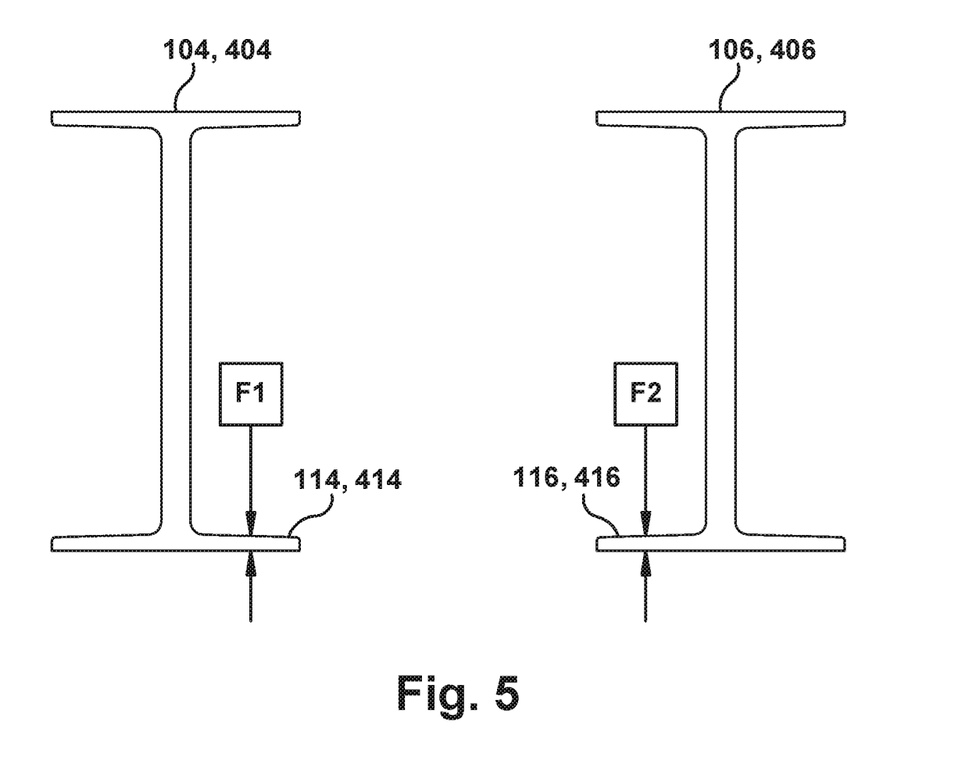
FIG. 5 is a schematic representation showing forces of the apparatus of FIG. 4A and the apparatus of FIG. 1A acting on trailer beams.

FIG. 5 is a schematic representation showing forces of the apparatus 400 of FIG. 4A and the apparatus 100 of FIG. 1A acting on the first trailer I-beam 104, 404 and the second trailer I-beam 106, 406. More specifically, a force "F1" acts on the only one flange 114, 414 of the first trailer I-beam 104, 404, and a force "F2" acts on the only one flange 116, 416 of the second trailer I-beam 106, 406. Accordingly, the weight of the apparatus 100, 400 is supported by only one flange of the first trailer I-beam 104, 404 and only one flange of the second trailer I-beam 106, 406.

It should be apparent that the apparatus 100, 400 constructed in accordance with the above-described example embodiments combines the advantages of low-cost fabrication and low-cost assembly. This is because each of the above-described example embodiments is relatively easy to fabricate and assemble. Each of the apparatus 100, 400 is also relatively easy to install in retrofit applications as well as new production applications.

The implementation of the embodiment of FIGS. 4A and 4B is especially easy to fabricate and assemble if the first and second top L-shaped supporting members 410, 412 and the first and second bottom L-shaped supporting members 420, 422 are all fabricated with the same length and same design. In this case, only two different parts (not counting any threaded bolts and threaded nuts) need to be fabricated and inventoried. The two parts that would need to be inventoried are the U-shaped component mounting plate 402 and the L-shaped supporting member of the same length.

The need to inventory only two different parts (i.e., the U-shaped component mounting plate 402 and the L-shaped supporting member of the same length and design) speeds up not only production of new vehicles but also speeds up servicing of existing vehicles. The U-shaped component mounting plate 402 with the one or more vehicle modules 408 secured thereto provides a single modular package design that is very easy to train production personnel to install during a production operation. The single modular package design also provides trailer fleet customers with consistency among their trailers despite the trailers of the fleet being from many different manufacturers. This consistency allows service personnel to be easily trained to uninstall and re-install during a service operation or a retrofit operation. Accordingly, the single modular package design provides trailer original equipment manufacturers (OEMs) a single module to speed up production of new trailers, and provides trailer fleet customers a single solution to easily service their trailer fleet.

It should also be apparent that only a small number of bends are required to fabricate the two different parts. No part needs to be fabricated with any lugs (i.e., lugless parts) or special openings for receiving any flange of a trailer I-beam. Only simple drill-through openings for receiving threaded bolts are needed. Accordingly, such parts are very easy to fabricate and to assemble together.

Although the above description describes the apparatus 100, 400 being used in a vehicle trailer having I-beams, it is conceivable that the apparatus 100, 400 may be used in a vehicle trailer having beams of any profile or shape. For example, the beams of the vehicle trailer may comprise any combination of I-beams, L-beams, T-beams, C-beams, or any other trailer beams having different profiles and shapes. Each trailer beam needs to have only one flange on which a top supporting member (e.g., the first L-shaped top supporting member 410 shown in FIGS. 4A and 4B) can engage and be supported.

Also, although the above description describes the apparatus 100, 400 being used in a vehicle trailer, it is conceivable that the apparatus 100, 400 may be used in other types of applications, such as dollies, tractors, straight trucks, busses, and the like, for example.

While the present disclosure has been illustrated by the description of example processes and system components, and while the various processes and components have been described in detail, applicant does not intend to restrict or in any way limit the scope of the appended claims to such detail. Additional modifications will also readily appear to those skilled in the art. The disclosure in its broadest aspects is therefore not limited to the specific details, implementations, or illustrative examples shown and described. Accordingly, departures may be made from such details without departing from the spirit or scope of applicant's general concept.

What is claimed is:

1. An apparatus for supporting an associated component mounting plate that is suspended between an associated first trailer beam and an associated second trailer beam, the apparatus comprising:
   a pair of top supporting members including (i) a first top supporting member secured to the associated component mounting plate, and (ii) a second top supporting member secured to the associated component mounting plate, wherein each of the first and second top supporting members spans between and engages the first and second associated trailer beams;
   a pair of bottom supporting members including a first bottom supporting member and a second bottom supporting member; and
   a pair of fastening mechanisms including:
      a first fastening mechanism that secures at least the first top supporting member to the associated component mounting plate, the first fastening mechanism including a first pair of substantially L-shaped brackets in which one leg of each L-shaped bracket is secured to the associated component mounting plate and the other leg of each L-shaped bracket is secured to at least one of the first top supporting member and the first bottom supporting member; and a second fastening mechanism that secures at least the second top supporting member to the associated component mounting plate, the second fastening mechanism including a second pair of substantially L-shaped brackets in which one leg of each L-shaped bracket is secured to the associated component mounting plate and the other leg of each L-shaped bracket is secured to at least one of the second top supporting member and the second bottom supporting member.

2. An apparatus according to claim 1, wherein each of the first and second bottom supporting members spans between and engages the first and second associated trailer beams.

3. An apparatus according to claim 2, wherein a length of each of the first and second top supporting members and a length of each of the first and second bottom supporting members are substantially the same.

4. An apparatus according to claim 1, wherein each of the first and second top supporting members and each of the first and second bottom supporting members comprises a substantially L-shaped member.

5. An apparatus according to claim 4, wherein (i) one leg of the L-shape of the first top supporting member and one leg of the L-shape of the first bottom supporting member are secured together, and (ii) one leg of the L-shape of the second top supporting member and one leg of the L-shape of the second bottom supporting member are secured together.

6. An apparatus according to claim 1, wherein:
the other leg of each L-shaped bracket of the first fastening mechanism is secured to both the first top supporting member and the first bottom supporting member; and
the other leg of each L-shaped bracket of the second fastening mechanism is secured to both the second top supporting member and the second bottom supporting member.

7. An apparatus comprising:
a component mounting plate that is suspended between a first trailer beam and a second trailer beam;
one or more vehicle modules secured to the component mounting plate;
a pair of top supporting members including (i) a first top supporting member secured to the component mounting plate, and (ii) a second top supporting member secured to the component mounting plate, wherein each of the first and second top supporting members spans between and engages a flange of the first trailer beam and a flange of the second trailer beam;
a pair of bottom supporting members including (i) a first bottom supporting member secured to the component mounting plate, and (ii) a second bottom supporting member secured to the component mounting plate, wherein each of the first and second bottom supporting members spans between and engages the flange of the first trailer beam and the flange of the second trailer beam; and a pair of fastening mechanisms including:
a first fastening mechanism that secures the first top supporting member and the first bottom supporting member to the component mounting plate, the first fastening mechanism including a first pair of substantially L-shaped brackets in which one leg of each L-shaped bracket is secured to the component mounting plate and the other leg of each L-shaped bracket is secured to at least one of the first top supporting member and the first bottom supporting member; and
a second fastening mechanism that secures the second top supporting member and the second bottom supporting member to the component mounting plate, the second fastening mechanism including a second pair of substantially L-shaped brackets in which one leg of each L-shaped bracket is secured to the component mounting plate and the other leg of each L-shaped bracket is secured to at least one of the second top supporting member and the second bottom supporting member.

8. An apparatus according to claim 7, wherein length of each of the first and second top supporting members and length of each of the first and second bottom supporting members are substantially the same.

9. An apparatus according to claim 7, wherein each of the first and second top supporting members and each of the first and second bottom supporting members comprises a substantially L-shaped member.

10. An apparatus according to claim 7, wherein:
the other leg of each L-shaped bracket of the first fastening mechanism is secured to both the first top supporting member and the first bottom supporting member; and
the other leg of each L-shaped bracket of the second fastening mechanism is secured to both the second top supporting member and the second bottom supporting member.

11. An apparatus according to claim 7, wherein (i) the first top supporting member engages only one flange of the first trailer beam and only one flange of the second trailer beam, and (ii) the second top supporting member engages the only one flange of the first trailer beam and the only one flange of the second trailer beam.

12. An apparatus according to claim 11, wherein (i) the first bottom supporting member engages the only one flange of the first trailer beam and the only one flange of the second trailer beam, and (ii) the second bottom supporting member engages the only one flange of the first trailer beam and the only one flange of the second trailer beam.

13. An apparatus according to claim 7, wherein the one or more vehicle modules secured to the component mounting plate includes at least one of a trailer roll-stability module and a trailer anti-lock braking system (ABS) module.

* * * * *